March 19, 1929. A. G. LEGGE ET AL 1,706,303
METHOD OF AND APPARATUS FOR THE MANUFACTURE OF HOLLOW SHOE FORMS
Filed March 31, 1927   4 Sheets-Sheet 1

Inventors
Alfred G. Legge & Martin L. Alger
By Macleod Calvor Copeland & Dike
Attorneys March 19, 1929.   A. G. LEGGE ET AL   1,706,303
METHOD OF AND APPARATUS FOR THE MANUFACTURE OF HOLLOW SHOE FORMS
Filed March 31, 1927   4 Sheets-Sheet 2
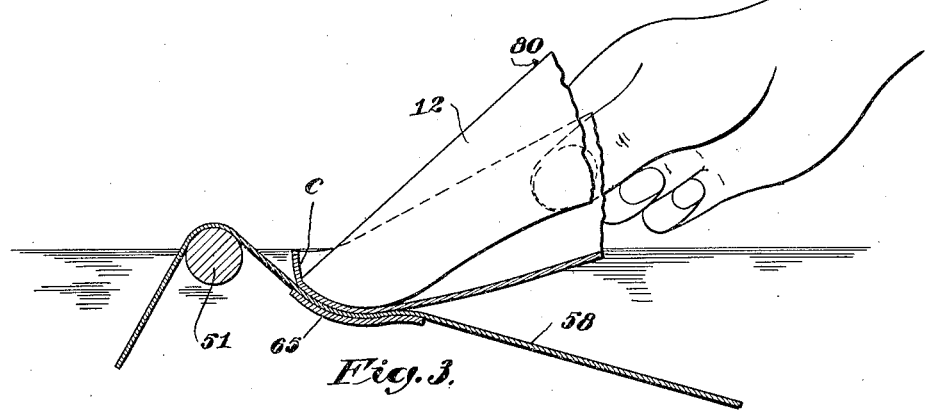
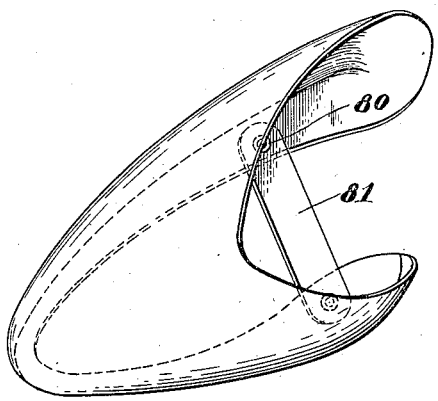
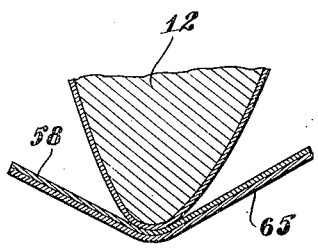
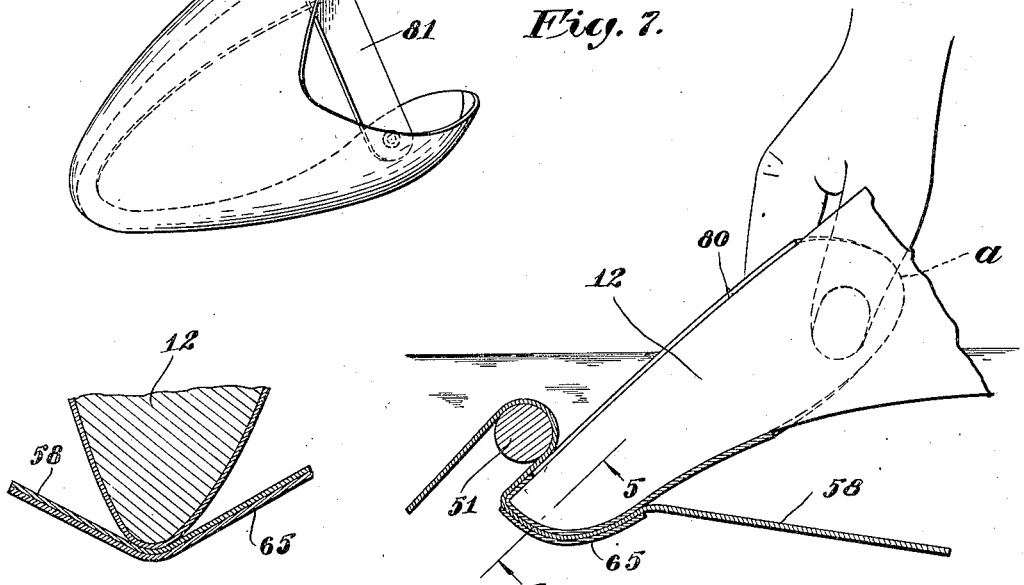

March 19, 1929.  A. G. LEGGE ET AL  1,706,303
METHOD OF AND APPARATUS FOR THE MANUFACTURE OF HOLLOW SHOE FORMS
Filed March 31, 1927   4 Sheets-Sheet 3

March 19, 1929. A. G. LEGGE ET AL 1,706,303
METHOD OF AND APPARATUS FOR THE MANUFACTURE OF HOLLOW SHOE FORMS
Filed March 31, 1927 4 Sheets-Sheet 4
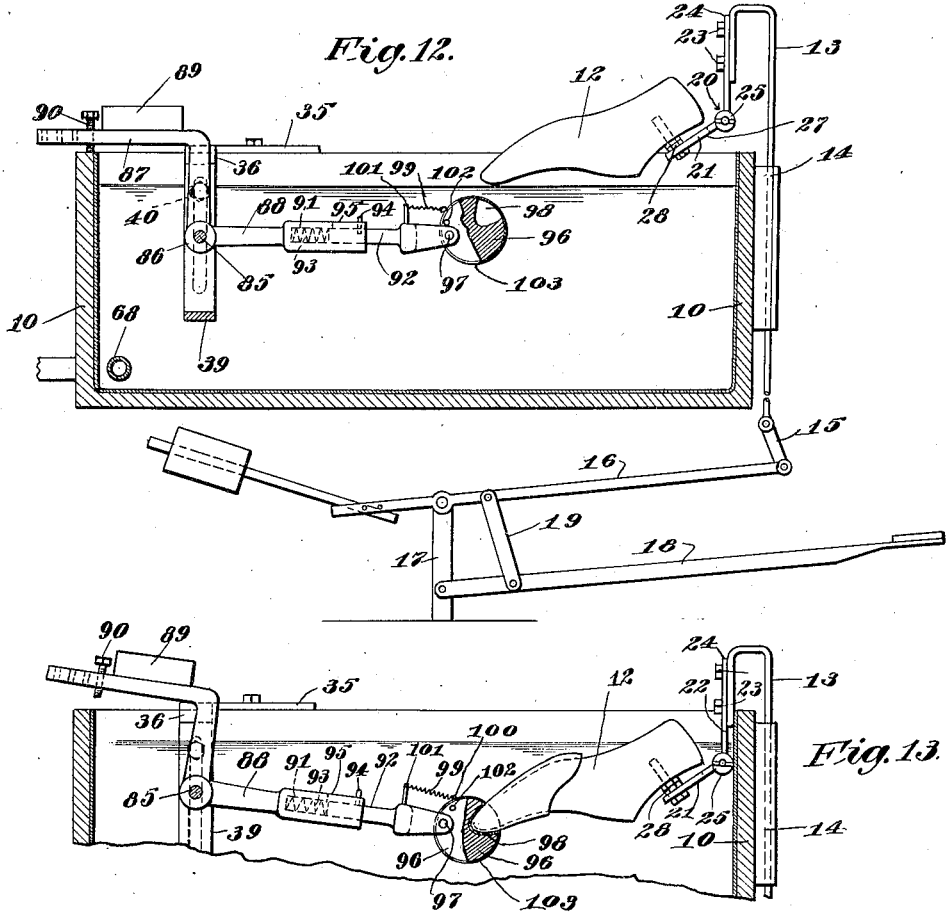
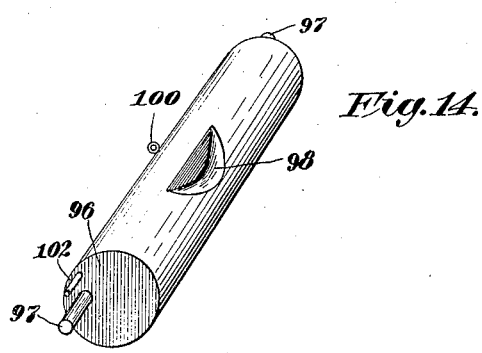
Inventors
Alfred G. Legge & Martin L. Algu
By Marcus Germ Copeland & Ske
Attorneys Patented Mar. 19, 1929.

1,706,303

UNITED STATES PATENT OFFICE.

ALFRED G. LEGGE, OF BROCKTON, AND MARTIN L. ALGER, OF EASTON, MASSACHUSETTS, ASSIGNORS TO C. S. PIERCE COMPANY, OF BROCKTON, MASSACHUSETTS, A CORPORATION OF MASSACHUSETTS.

METHOD OF AND APPARATUS FOR THE MANUFACTURE OF HOLLOW SHOE FORMS.

Application filed March 31, 1927. Serial No. 179,872.

This invention relates to the manufacture of hollow shoe forms from sheet material, such as celluloid, and has for its object to provide means whereby hollow shoe forms may be manufactured in an economical and simple manner.

In manufacturing shoe forms of this general type heretofore a plurality of molding operations have been commonly employed for shaping the sheet material upon a last, and even then the form thus produced has contained wrinkles and other objectionable features.

In accordance with the invention an improved shoe form is produced by forming over a last a suitably shaped blank of sheet material, such as sheet celluloid, preferably treated to assist in the shaping operation. This is accomplished by placing the blank over the toe portion of the last and stretching the blank towards the heel of the last while shaping it thereon in the presence of heat so that an outer edge of the blank rests smoothly upon the sole of the last. Preferably, the blank has a relatively stiff outer edge to engage the sole of the last while the interior area is softer and more pliable and the whole is held upon the toe portion of the last during the forming operation. In practicing my method in its preferred form, the celluloid or similar sheet material is preferably given a preliminary treatment with a liquid which will cause it to soften in the presence of heat but set when the heat is removed, and thereafter the liquid is partly removed from the edges rendering them harder than the interior. One suitable liquid for this purpose is a water solution of alcohol, when celluloid is the sheet material.

Before explaining the invention in detail it is pointed out that various features described are merely by way of illustration and it is not intended to limit the invention thereby except as expressed by the appended claims. The invention will be more clearly understood from the following description in conjunction with the accompanying drawings, in which;

Fig. 3 is a detail elevational view of a portion of the apparatus of Fig. 1 showing the relation of the parts at the beginning of the forming operation;

Fig. 4 is a similar detail view showing the relation of the parts at the end of the forming operation;

Fig. 5 is a sectional view taken upon the line 5—5 of Fig. 4;

Fig. 7 is a perspective view of the finished form;

Fig. 12 is an elevational view of a modified form of apparatus;

Fig. 13 is a partial elevational view of the apparatus of Fig. 12, showing the blank held against the toe of the last; and Fig. 14 is a detail perspective view of the folding roll shown in the apparatus of Figs. 12 and 13.

Figure 2:
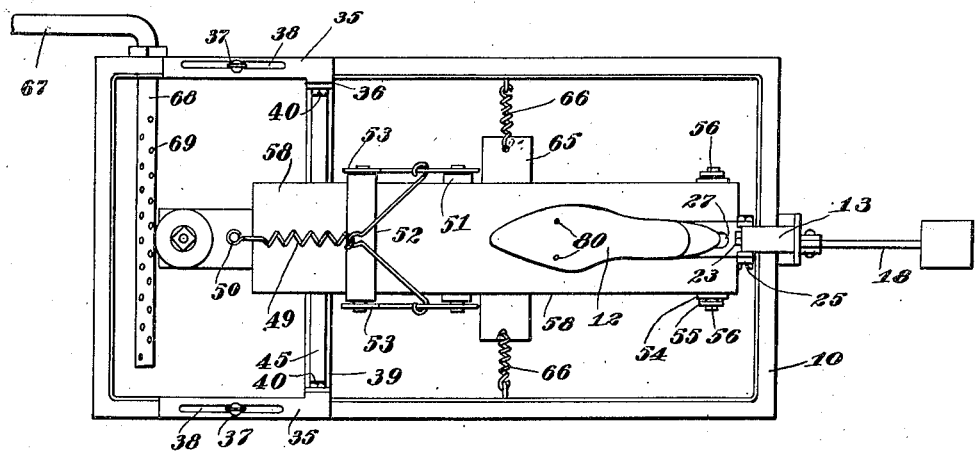
Fig. 2 is a plan view of the same.

A suitable apparatus for use in the practice of the invention comprises a receptacle 10 (Figs. 1 and 2), adapted to contain a heating medium, such as hot water, mounted upon a suitable support, such as a table 11. Any suitable means may be provided for supporting and moving a last 12 into and out of the receptacle.

As shown, a bar 13 is mounted to move within slide ways 14 upon the forward end of the receptable 10 and is pivotally connected at its lower end by a link 15 to a weighted arm 16 pivotally mounted upon a support 17. A treadle 18 is pivotally mounted upon the support 17 and is pivotally connected with the arm 16 by a link 19. A hinged last support 20 having arms 21 and 22 is adjustably mounted upon the upper end of the bar 13 by bolts 23 passing through a slot 24 in the arm 22 and engaging the upper end of the bar 13. The arm 21 may be clamped in a fixed position relative to the arm 22 by a suitable clamp 25. A stud 26 adapted to engage a hole in the last 12 is adjustably positioned on the arm 21 and for this purpose extends upwardly through a slot 27 in the arm 21 and is secured thereon by nuts 28.

Figure 1:
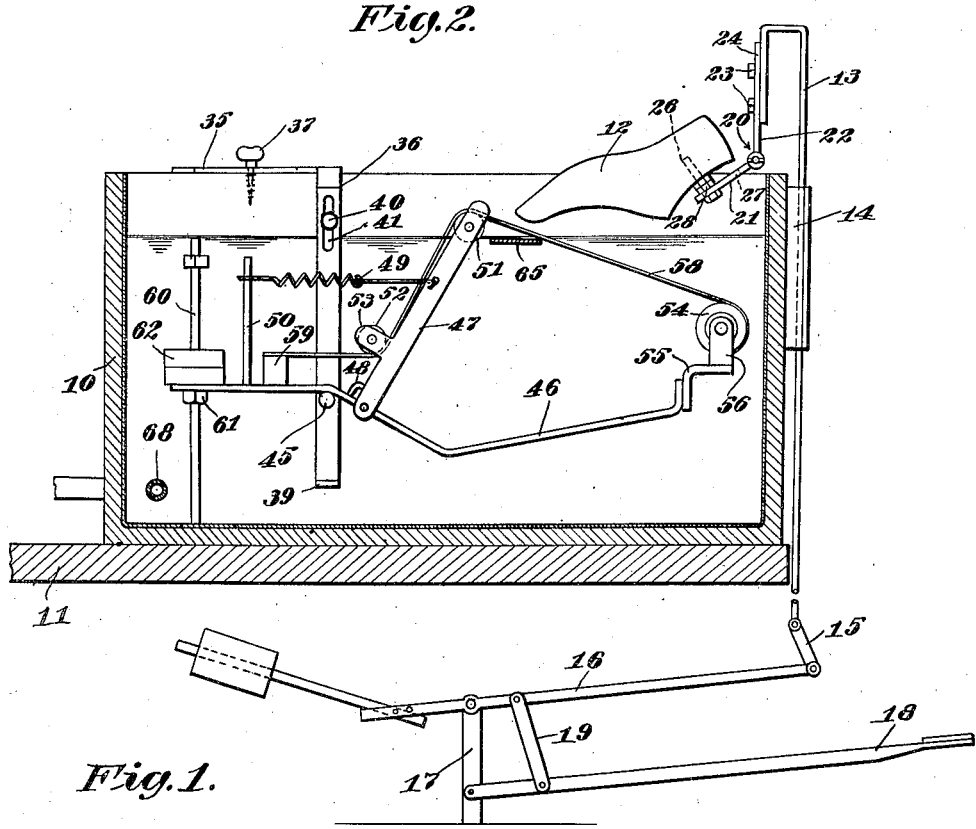
Fig. 1 is a sectional elevational view of an apparatus suitable for the practice of the invention.

Fixtures 35 having downwardly depending arms 36 are adjustably mounted upon the upper edges of opposite longitudinal sides of the receptacle by a thumb screw 37 passing through a slot 38 in the fixture and engaging the receptacle. A U-shaped support 39 is supported from and extends between the depending arms 36 of the fixtures 35 and is adjustably mounted thereon by bolts 40 passing through slots 41 in the support 39 and engaging the arms 36. A bar 45 extending across the receptacle 10 is rotatably mounted in the support 39 and carries a frame 46 fixed thereupon. A bracket 47 is pivotally mounted upon the frame 46 and is held normally in a substantially upright position (as shown in Fig. 1) against a stop 48 on the frame 46 by a spring 49 extending from the bracket 47 and secured to an upwardly extending rod 50 upon the frame 46. A roll 51 is rotatably mounted near the upper end of the bracket 47 and a roll 52 is rotatably mounted in lugs 53 upon the lower portion of the bracket 47. A roll 54 is held in a bracket 55 mounted upon the forward end of the frame 46 and may be held against rotation therein by suitable clamps 56. A strip of flexible material 58, such as canvas or rubber, is fixed at one end upon the roll 54 and extends over the roll 51 and under the roll 52 and is secured at its other end to a clamp 59 fixed upon the frame 46. A post 60 is adjustably mounted upon the rear end of the frame 46 and extends upwardly and downwardly therefrom, its position relative to the frame 46 being fixed in any convenient manner as by nuts 61. The downwardly extending portion of the post 60 serves as a stop limiting the upper position of the forward end of the frame 46. The upwardly extending portion of the post 60 serves for carrying weights 62 which counter-balance the frame 46 and tend to maintain the downwardly extending portion of the post 60 in engagement with the bottom of the vessel 10 so as to keep the frame 46 in proper operating position. If desired, a strip of flexible material 65, such as canvas or rubber, may be extended crosswise of the receptacle 10 and may be suspended from opposite sides thereof by springs 66. The water in the receptacle 10 is heated to a suitable temperature, usually from about 150° F. to about 180° F. by steam conveyed from any suitable source by a pipe 67 to the pipe 68 provided with apertures 69 within the receptacle.

Figure 6:
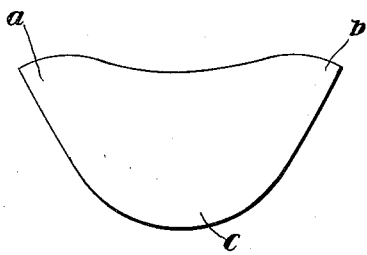
Fig. 6 is a detail view of a blank showing its shape before the forming operation.

In the manufacture of shoe forms a blank of sheet material, such as celluloid, of the form shown in Fig. 6, is cut from stock of the sheet material. This blank may then be shaped over a last in the condition in which it is received, or it may be given a preliminary treatment as hereinafter more fully described. The operator then grips the opposite corners a and b and places the blank in the hot water, the desired temperature of which depends upon the character of the blank being worked, to soften it. The toe portion c of the blank is now brought against the upper of the toe portion of the last 12 with an edge extending above the sole of the last (as shown in Fig. 3) and the last 12 and the blank are moved downwardly into the hot water so that either or both of the strips 58 and 65 will exert an upward pressure tending to hold the blank against the toe portion of the last. Upon further downward movement of the last 12, the bracket 47 is forced forwardly so that the roller 51 will press the edge of the toe portion c of the blank against the sole of the toe portion of the last. At the same time the operator stretches the blank by pulling the corners a and b towards the heel and sole of the last, or in a diagonal direction, while shaping it thereupon. This operation causes the outer edge of the blank between the points a, c, b to engage and rest smoothly upon the sole of the last.

Figure 8:
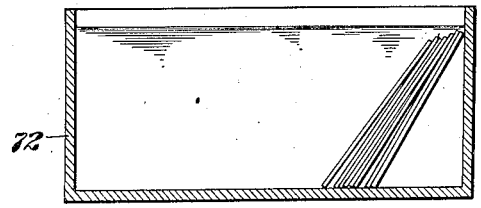
Fig. 8 is a sectional elevational view of a tank in which the blanks are treated prior to the forming operation.
Figure 11:
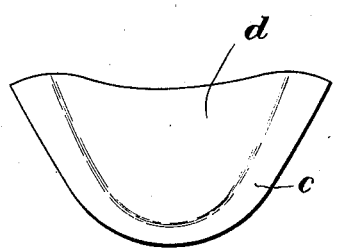
Fig. 11 is a detail view of a treated blank having a relatively stiff outer edge.

In accordance with the preferred practice of the invention the blank is treated prior to the shaping operation in such a manner that the interior portion d will soften in the presence of heat and leave an outer edge e (Fig. 11) relatively stiff and in such condition that the blank will set quickly when the heat is removed. A suitable method for accomplishing this comprises immersing the blanks in a tank 72 (Fig. 8) which contains a liquid, preferably, a water solution of a solvent, such as alcohol, for the sheet material. When alcohol is used it should be mixed in about the proportions of 50 per cent water and 50 per cent alcohol. In practice, the strength of the solution is controlled by the use of a hydrometer having a spirit proof scale which registers zero for pure water and 200 for pure alcohol. A solution of suitable concentration for the purpose of the invention is obtained by mixing alcohol and water so as to obtain a reading upon the hydrometer scale of from about 98 to about 120. The blanks usually are allowed to remain in this liquid over night or about 24 hours and are then removed and placed in a suitable clamp which is arranged so as to retain substantially all of the liquid in the interior portion d of the blank, but to leave the outer edge e exposed to the air so that a portion of the liquid may be removed.

Figure 9:
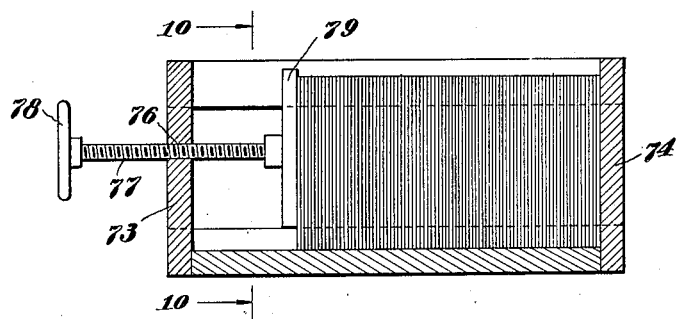
Fig. 9 is a sectional elevational view of a device in which the treated blanks may be stored.
Figure 10:
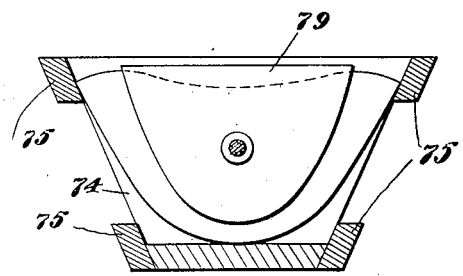
Fig. 10 is a sectional view taken upon the line 10—10 of Fig. 9.

A suitable device for this purpose is shown in Fig. 9 and comprises solid end portions 73 and 74, substantially of the shape of a trapezoid, which are held in spaced relation by bars 75. The end portion 73 is provided with a threaded opening 76 to receive a screw 77 operated by a knob 78 at one end and having a clamp 79 mounted upon its opposite end to move longitudinally of the device when the screw is rotated, the clamp 79 being shaped to conform substantially to the shape of the interior portion d of the blank. It has been found that when the blanks are treated in this manner and placed in the clamping device they will remain in a suitable tempered condition for the practice of the invention about a week.

When blanks thus treated are shaped upon the last 12 as hereinbefore explained the outer edge portion e rests smoothly upon the sole of the last, whereas if that portion had been fully tempered it would stretch out so as to leave the outer edge of the blank which engages the sole of the last too narrow. In practice, the thus treated blank is shaped upon the last 12 and the last together with blank thereon is removed from the supporting stud 26 and replaced by another similar last. A blank is shaped over the second last which is then removed from the stud 26. By this time the first shaped blank has set sufficiently so that it may be removed from the last without distortion.

The sole of the last 12 is provided with a pair of spaced upwardly projecting sharp objects 80, such as tacks, which are positioned thereon so as to engage the sole portion of the form when shaped upon the last and thereby make an impression therein which indicates the position for the rivets 81 which hold the cross piece 82 to the sole of the form.

In a modified form of apparatus which may be employed in carrying out the invention, a rod 85 extending across the receptacle 10 is pivotally mounted upon the support 39. A lever 86 having a rearwardly extending arm 87 and a forwardly extending arm 88 is fixed upon the rod 85. The arm 87 carries a weight 89 and stop screw 90. The arm 88 is provided with a depression or hole 91 at its ends to receive one end of a bifurcated rod 92. The rod 92 is resiliently held in the arm 88 by a spring 93 and its foremost position is limited by a pin 94 thereon moving in a slot 95 in the arm 88. In the other end of the rod 92 a roll 96 is eccentrically mounted to turn about the pivot pin 97 and is provided with a depression 98 to receive the toe portion of the last 12 and hold a blank thereagainst during the forming operation. If desired, a band of flexible material 103, such as rubber, may surround the roll 96 so as to cover the depression 98. The roll 96 is prevented from turning freely about the pivot pin 97 by a spring 99 extending between an eye 100 on the roll and a rod 101 on the arm 92, its counter-clockwise movement being limited by a pin 102 engaging the surface of the bifurcated portion of the arm 92.

In using this form of apparatus in the manufacture of shoe forms, the blank, preferably, treated as hereinbefore described, is gripped at the corners a and b and softened in the warm water and placed against the toe portion of the last 12 with an outer edge extending over the sole of the last. The last 12 is then moved downward into the warm water with the toe portion engaging the depression 98 or the flexible material over the depression which serves to hold the blank against the last while the former is stretched towards the heel of the last and shaped thereupon.

What we claim is:

1. The method of making shoe forms which comprises treating a suitably shaped blank of sheet material to soften the interior portion and leave an outer edge relatively stiff, and shaping the blank over a last with the relatively stiff edge on the sole of the last.

2. The method of making shoe forms which comprises treating a suitably shaped blank of sheet material with a liquid to wet the same, removing liquid from an outer edge thereof, and shaping the blank over a last with said outer edge on the sole of the last.

3. The method of making shoe forms which comprises treating a suitably shaped blank of sheet celluloid with a water solution of a solvent therefor in such a manner that the blank will soften in the presence of heat but will set when the heat is removed, and shaping the thus treated blank over a last in the presence of heat.

4. The method of making shoe forms which comprises treating a suitably shaped blank of sheet celluloid with a water solution of alcohol in such a manner that the blank will soften in the presence of heat but will set when the heat is removed, and shaping the thus treated blank over a last in the presence of heat.

5. The method of making shoe forms which comprises treating a suitably shaped blank of sheet celluloid in such a manner that the interior portion will soften in the presence of heat and leave an outer edge relatively stiff but will set when the heat is removed, and shaping the blank over a last with the relatively stiff outer edge on the sole of the last.

6. In an apparatus of the character described, a receptacle, means for supplying heat within the receptacle, means for moving a last into and out of the receptacle, and means pivotally mounted within the receptacle for holding a blank of sheet material against the toe portion of the last when moving into and out of the receptacle.

7. In an apparatus of the character described, a receptacle, means for supplying heat thereto, means for moving a last into and out of the receptacle, and means movably and pivotally mounted within the receptacle for holding a blank of sheet material against the toe portion of the last when moving into and out of the receptacle.

8. In an apparatus of the character described, a receptacle, means for supplying heat thereto, means for moving a last into and out of the receptacle, a frame movable within the receptacle, and means on said frame for holding a blank of sheet material against the toe portion of the last when moving into and out of the receptacle and including a roll.

9. In an apparatus of the character described, a receptacle, means for moving a last into and out of the receptacle, a frame pivotally mounted within the receptacle, a bracket pivotally mounted upon the frame, and a strip of flexible material secured to the frame and extending over said bracket so as to move relative thereto.

10. In an apparatus of the character described, a receptacle, means for moving a last into and out of the receptacle, a frame pivotally mounted within the receptacle, a bracket pivotally mounted upon the frame, a strip of flexible material secured to the frame and extending over said bucket so as to move relative thereto, and resilient means acting upon said material.

11. In an apparatus of the character described, a receptacle, means for moving a last into and out of the receptacle, a frame movable within the receptacle, means carried by said frame for holding a blank of sheet material against the toe portion of the last, and a spring cooperating with said last mentioned means.

12. The method of making shoe forms which comprises treating a suitably shaped blank of sheet material to soften the interior portion and leave an outer edge portion relatively stiff, and forming the blank to the shape of a last with the relatively stiff outer edge on the sole of the last while stretching the blank towards the heel of the last to cause the outer edge portion to rest smoothly on the sole of the last.

13. A blank of sheet material adapted to be shaped over a shoe last, said blank having a relatively soft interior portion and a relatively stiff outer edge portion.

14. A blank of sheet celluloid adapted to be shaped over a shoe last, said blank having a relatively soft interior portion and a relatively stiff outer edge portion.

In testimony whereof we affix our signatures.

ALFRED G. LEGGE.
MARTIN L. ALGER.